Dec. 13, 1927.
J. F. KEY
1,652,675
DEVICE FOR DIRECTING THE FLOW OF GAS FROM A GAS SUPPLY TO A GAS RECEIVER
Filed Oct. 17, 1923
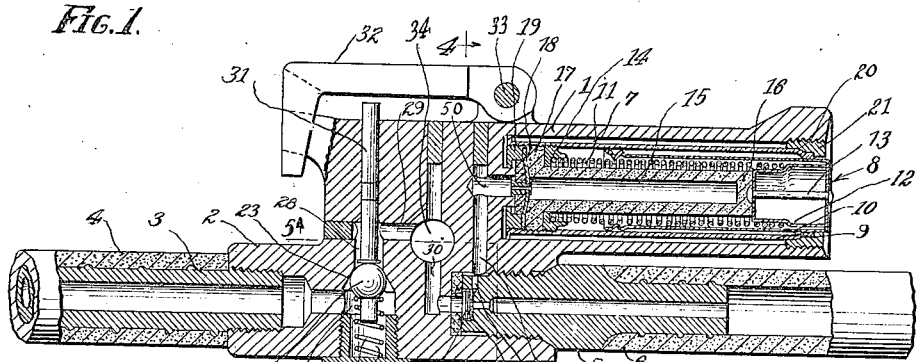
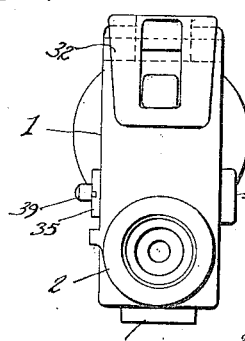
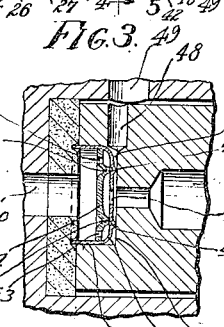
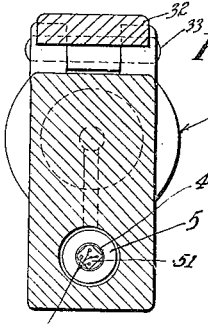
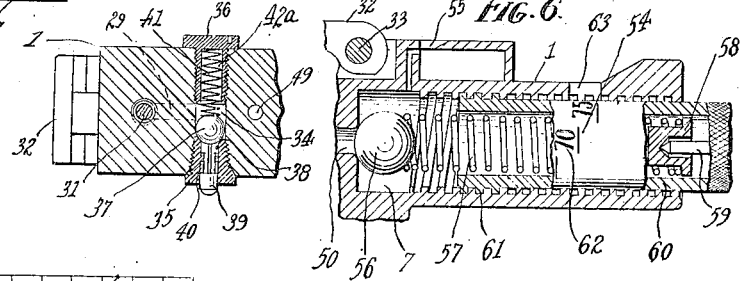
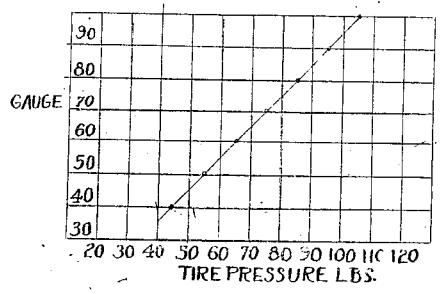
Inventor
JAMES FRANCIS KEY
By Lyon & Lyon
Attorney Patented Dec. 13, 1927.

1,652,675

UNITED STATES PATENT OFFICE.

JAMES FRANCIS KEY, OF SIERRA MADRE, CALIFORNIA, ASSIGNOR TO FIRST TRUST AND SAVINGS BANK OF PASADENA, TRUSTEE, OF PASADENA, CALIFORNIA.

DEVICE FOR DIRECTING THE FLOW OF GAS FROM A GAS SUPPLY TO A GAS RECEIVER.

Application filed October 17, 1923. Serial No. 669,156.

This invention relates to a device for directing the flow of gas from a gas supply to a gas receiver, and in the preferred embodiment refers to a device for inflating automobile tires, although it is not intended to limit the invention to such use as the invention is adapted for various other uses as will be apparent from a description of the device and its mode of operation hereinafter contained.

In my Patent No. 1,444,188, patented February 6, 1923, there is described a device for inflating automobile tires including a valve and pressure indicating unit. The pressure indicator is adapted to indicate the pressure in the tire when the air supply is cut off. With such device, the pressure indicator reflects the air pressure in the tire or another gas or air receiver only when the air or gas is turned off the device, when the air supply is turned on the device and the air forced under high pressure through the same the air indicator reflects the pressure in the air supply, since the pressure of the air supply is customarily between 175 pounds gage to 200 pounds pressure. This compelled the indicator member to be constructed sufficiently strong to withstand said pressure and when the indicator member is constructed of sufficient strength to withstand this high pressure the indicator member is comparatively inaccurate for determining the comparatively lower pressure of the tire. Moreover in such a device there is continually received a quantity of lubricant or lubricating oil which works into the pressure indicating unit and effects the operation and life of said unit.

One object of this invention is to provide a device for directing a flow of a gas from a gas supply to a gas receiver, which device is provided with means for establishing a zone of gas pressure in communication with the gas receiver through the same conduit as the body of the gas in said device, which zone is maintained while the air is flowing through the device at a substantially lower pressure than the body of the gas in the device, whereby such zone may be connected to a pressure indicating unit or other device actuated by pressure for controlling the operation of the device without such indicator or equivalent unit being subjected to the high pressure of the gas supply unit and while still providing such a unit as may reflect or be acted upon by the pressure in the gas receiver when the gas supply is cut off.

A further object of the invention is to provide a device for directing the flow of gas from a gas supply into a gas receiver, with a pressure operated member which is controlled by a zone of gas pressure in communication with the gas receiver through the same conduit as the gas flowing into the receiver, which zone is maintained substantially independent of the pressure in said gas supply at a pressure substantially corresponding to the pressure of the gas receiver, to the end that the device may be continually employed for directing the flow of gas into the gas receiver and throughout the flow of said gas, said pressure controlled member will continually react only according to the pressure of the gas receiver.

Another object of this invention is to provide a device for directing the flow of gas from a gas supply to a gas receiver, which device is provided with means for maintaining a zone of pressure corresponding to the pressure in the gas receiver and communicating with the gas receiver through the same conduit as the gas flowing to the receiver, and in which said pressure will be maintained in said zone even when the flow is nonpulsating, when a substantially higher pressure than the pressure in the gas receiver is sent through the device, and when said conduit in communication with said zone is at a substantially higher pressure than the pressure in said receiver.

A further object of the invention is to provide a form of tire inflating device by which a tire may be inflated from an air pressure source which sends lubricant along with the air supply without said lubricant being directed to the pressure indicator unit or other pressure operated member of the device to the end that the operation and life of said member will be substantially unaffected by the leakage of lubricant from the gas supply.

Various other objects and advantages will be more fully apparent from the following description of the accompanying drawings which form a part of this disclosure and which illustrate the preferred form or embodiment of the invention.

In the drawings:

Figure 1 is a side elevation mainly in longitudinal vertical section of the preferred embodiment of the invention.

Fig. 2 is an end elevation of Figure 1.

Fig. 3 is an enlarged longitudinal vertical section of the means for forming the desired low pressure zone.

Fig. 4 is a vertical section on the line 4—4 of Fig. 1.

Fig. 5 is a horizontal section taken on the line 5—5 of Fig. 1.

Fig. 6 illustrates the construction of a modified form of a gas operated member which may be employed in place of the gas operated member or indicating gage shown in Figures 1 to 5, inclusive, and Fig. 7 is a diagram illustrating the change in pressure applied to the gas operated member with different pressures present in the gas receiver or tire.

In the drawings, the device comprises a body 1 having a tubular projection 2 to which is threaded a hose nipple 3 for connecting an air supply conduit 4 which is to be connected to a gas supply such as a gas pump or tank (not shown). A second hose nipple 5 is threaded into the body 10 at the opposite end of the body and preferably parallel to the hose nipple 2 and a flexible conduit or hose 6 is attached thereto. In operation of the device the hose or conduit 6 leads to the gas receiver (not shown). Above the hose nipple 5 the body 1 has a bore 7 which is longitudinally parallel with the hose nipple 5 and in which is positioned a gas operated member 8. In the embodiment of the invention illustrated in Figures 1 to 5, inclusive, the member 8 is in form of a pressure gage, said gage having a tubular casing 9 in which is slidably mounted an indicator sleeve 10 adapted to be translated by an expansion element and bearing indicating characters or figures on one or more sides of its peripheral surface to be exposed beyond the body wall and indicate different degrees of pressure applied to gas operated member 8. A coil spring 11 is positioned within the sleeve 10, one end thereof being attached to a spring anchor member 12 fixed to the outer end of the sleeve 10 by a pin 13 as shown in Figure 1. The opposite end of the spring 11 is fixed to a threaded bushing 14 screw threaded into the inner end of the sleeve 10. A rubber expansion tube 15 extends into the coil spring 19 and has a closed outer end 16 and a flanged inner end 17. The flanged end 17 seats on a perforated disc 18 which, in turn, is engaged by a bushing 19 screw-threaded into the innermost end of the sleeve 10. The outer end of the sleeve 10 engages a recess 20 in a bushing 21 threaded into the outer end of the longitudinal bore 7 of the body 1.

In operation, compressed air entering the expansion tube 15 expands said tube to engage its side walls with each convolution of the spring 11 and elongates the tube 15 to forcibly translate the indicating sleeve 10 outwardly to varying degrees depending upon the pressure supplied thereto. The spring 11 being anchored to the threaded bushing 14 and to the sleeve 10 through the anchor member 12 serves to react the indicator sleeve 10 coincident to a decrease in the applied pressure.

Adjacent to and communicating with the bore of the hose nipple 3 is a chamber 22 formed to provide a valve seat 23 with which cooperates a ball valve 24, as a main gas supply valve. The ball 24 is yieldingly maintained against the valve seat 23 by a coil spring 25, which seats in a recess 26 formed in a plug member 27 screw-threaded into the body 1 in alinement with the chamber 22. Inwardly beyond the main valve 24 the body is bored to provide a second chamber 28 which communicates through a horizontal passage 29 and vertical passages 30 with the bore of the hose nipple 5.

The means for operating the main gas supply valve 24 comprises a stem 31 aligned with the chamber 22 with its upper end extending exteriorly of the body 1 and positioned for engagement with the lever 32 pivoted on the body 1 at 33.

To control the condition wherein a gas receiver had been overcharged, I provide an independent means for exhausting gas from the gas receiver until the pressure therein is properly reduced, such means comprising a chamber 34 extending laterally through the body 1 at the intersection of the horizontal passage 29 and vertical passage 30. A plug 35 is threaded into the body 1 at one end of the chamber 34 and a plug 36 is threaded into the body 1 at the opposed end of said chamber 34, 37 indicates a ball valve which engages a valve seat 38 formed on the inner end of a plug 35. This valve 37 is engaged by a slotted stem 39 which fits loosely in a bore 40 of said plug 35 and extends beyond the wall of the body 1. The valve 37 is evenly held on its seat 38 by a spring 41 seated in a recess 42ª in the plug 36. When it is desired to release gas from the gas receiver, the slotted stem 39 is placed inwardly to unseat the valve 37 allowing the gas to escape from the chamber 34 past said valve 37, around the loose fitting valve stem 39 to the atmosphere.

The construction of the device so far described is largely identical with the inflating device described in my previous patent and such construction is essential only to the preferred embodiment of the invention heretofore referred to. The crux of the present invention resides in the connection between the gas operated member 8 and the hose 6 leading to the gas receiver. By this invention, I provide means for establishing a zone of gas pressure substantially lower than the pressure of the gas in the passages from the hose nipple 3 to hose nipple 5 and gas in the hose nipple 5, said means comprising a jet forming member 42 which is inserted in a recess 43 formed in the inner end of the hose nipple 5. Said member 42 is provided with cylindrical walls 44 fitting tightly with the walls of the recess 43 in the hose nipple 5 and the inner end of the jet forming member 42 is substantially closed, being provided with an orifice 45 aligning with the bore of the hose nipple 5 and of a diameter relatively smaller than the diameter of the bore of said hose nipple 5 adjacent the orifice 45. The jet forming member 42 is further provided with inwardly pressed lugs 46 which engage the base wall of the recess 43 and maintain the closed end of the jet forming member 42 slightly spaced therefrom. There thus exists a chamber 47 between the jet forming member 42 and the hose nipple 5. Said chamber communicates through a lateral duct 48 in the hose nipple 5 with a passage 49 extending vertically in the body 1 of the device. Said passage 49, in turn, communicates through a lateral way 50 with the gas operated member 16.

Within the jet forming member 42 is provided a jet increasing member 51 which is substantially disc shaped and is forced tightly within the cylindrical walls 44 of the member 42 until it is close to the closed end of said member, lugs 52 being pressed inwardly from the jet increasing member 51 to hold the same spaced from the jet forming member 42. Near the periphery of the member 51 is provided a number of openings 53 through which the air or gas flowing through the device pass while flowing from the passage 30 to the hose nipple 5.

In use the hose 6 is attached to the gas receiver such as a tire to be inflated in which case the end of the hose nipple 5 is provided with a coupling device which will serve to unseat the tire valve, the construction of such devices now being well understood in the art. At such time a portion of the gas in the gas receiver will flow back into the hose 6 through the chamber 47, duct 48, passage 49, way 50, to the bore of the expansion tube 15 of the gas-operated member 8 and a reading may then be had of the degree of pressure in the gas receiver. The lever 32 is then depressed engaging the stem 31 to unseat the gas supply valve 24. The gas will then flow through the device to and through the openings 53 of the jet increasing member 51 through the orifice 45 in the jet forming member 42 and to and through the hose nipple 5. The passage of air through the orifice 45 being restricted, the gas will jet through said orifice and expand as the same enters the bore of the hose nipple 5. This jetting effect provides a suction action on the chamber 47, thus causing such chamber 47 to be a zone of pressure lower than the pressure flowing through the bore of the nipple 5 or other passage-ways through the device and thus prevents an excessive pressure being applied to the gas operated member 8 thereby eliminating the undue wear upon said member and permitting the use of a more accurate member for indicating pressure than can be employed where the full pressure of the gas or air flowing through the device is applied to the gas operated member. The member 51 increases the jetting effect through the orifice 45 by causing the gas to flow in converging paths towards the orifice 45 and thus the jet or stream of gas beyond the orifice 45 is converging and an increased suction effect or reduction of the pressure in the zone 47 is effected. The pressure in the zone 47 is dependent upon the velocity of the flow of air through the jet forming member 42 and orifice 45 and thus is not dependent upon the air pressure in the gas or air supply to the device, but the pressure in said zone 47 is effected by the pressure in the gas receiving member or the tire to be inflated by the device. In fact, it is found that the pressure of such zone 47 is substantially unaffected by the pressure of the gas supply to the device and corresponds in magnitude with the pressure in the gas receiver.

Fig. 7 illustrates a diagram of the pressure at the zone 47 as indicated by the gas operated member 8, with varying pressures in the gas receiver. From said diagram it appears that with the pressure in the tire or gas receiver at 40 pounds the pressure indicated by the member 8 when the gas or air is continuously flowing through the device is 37 pounds, i. e. 3 pounds lower than the pressure in the tire receiver. When the pressure in the tire receiver becomes 100 pounds the pressure indicated by the member 8 is 97 pounds, thus showing that the gage pressure corresponds substantially with the pressure of the gas receiver. (An increase of 60 pounds in the gas receiver, causing a corresponding increase of 60 pounds in the zone 47.) This diagram is obtained from actual use of the device and when the device was connected to a gas tank maintained at a pressure of 180 pounds. A large variation in the pressure of the gas supply such as 60 pounds causes but a very slight variation in the pressure of the zone 47 which still substantially corresponds to the gas pressure in the gas receiver. This variation with a different pressure was found not to exceed 7 pounds. Where the zone 47 is said to be at a pressure corresponding to the pressure in the gas receiver this does not necessarily imply that the pressure of the zone 47 will be exactly or substantially equal to the pressure in the gas receiver, but simply means that a change of a certain number of pounds in the pressure of the gas receiver will produce substantially the same change in pounds in the zone 47. By varying the ratio between the diameter of the orifice 45 and the small bore of the nipple 5 and by such means as the jet increasing member 51, the pressure in the zone 47 may be caused to vary. Thus, for a pressure in the gas receiver of 50 pounds a corresponding pressure in the gage might indicate for example 20 pounds or 70 pounds. With each construction of the device, however, thereafter an increase of a certain number of pounds in the gas receiver will cause corresponding increase in the pressure of zone 47.

I have found it, however, entirely practical (as shown by Fig. 7) to correctly proportion the relative diameter of the orifice 45, small bore of the nipple 5 and the construction of the member 51 so that at all pressures of the gas receiver the pressure of the tire will be substantially equal thereto. The exact construction or proportion between such diameters will, however, depend upon the nature of the coupling to maintain the valve stem of the tire open, and the nature of the hose or conduit 6 between the zone 47 and the receiver, and when the device is applied to other uses and with other coupling devices, and conduits 6 such factors may be varied. By actually testing various size jet forming members 42 and jet increasing member 51, the correct construction of such members may be determined for such other analagous uses of the devices. If the device is to be employed with such tire coupling devices as are described in my Patent No. 1,385,080, patented July 19, 1921, I have found that if the diameter of smaller bore of the nipple 5 is .052 inches and the diameter of the orifice 45 is .043 inches, the member 8 will follow the line shown in Fig. 7 and this without the use of the jet increasing member 51, the use of said member being optional and not essential to the device.

The apparatus thus described operates in accordance with the following principles, when it is so constructed as to form a zone of pressure at the point 48, which is equal to the pressure in the receiver or tire. There will be a continuous decrease in pressure from the source of gas or fluid until the restriction of the member 51 is reached where there is a marked sudden drop of pressure. Down stream from the member 51, the conduit having a larger area than the openings through the member 51 permits a decrease in the velocity of the fluid or gas with a resulting increase in pressure, forming a second maximum pressure point shortly after the gas leaves the member 51. Therefrom there is another gradual decrease in pressure from this maximum point up to the restriction formed by the valve of the tire, at which valve there is another abrupt drop in pressure. The rise in pressure of the fluid after it leaves the restriction formed by the member 51 is proportional to the square of the quantity of fluid per minute which is flowing through the conduit. The rise in pressure is also determined by a constant, herein called a restriction constant, whose value depends upon the areas of the restriction and conduit at a point spaced slightly from the restriction in the direction of the tire. By varying the areas of the restriction and adjacent portion of the conduit, the numerical value of this constant can be changed, as desired. The drop in pressure from the high pressure point between the restriction and receiver is also proportional to the square of the quantity of fluid flowing through the receiver and to a constant whose value depends upon the length and diameter of the conduit between the restriction and valve stem and the character and diameter of the valve stem of the automobile tire. It will thus be seen that by a proper design of the size of the restriction at 51 in relation to the conduit and usual valve stem of a tire, the rise of pressure of the fluid flowing through the conduit between the source and receiver after the fluid leaves the restriction at 51, can be made to equal exactly the drop in pressure in said fluid from said point into the receiver, with the result that the pressure adjacent the restriction 51 will be equal to the pressure in the tire receiver and that this relationship is entirely independent of the pressures in the source or receiver and the rate of flow of the fluid through the connecting conduit. The constant determining the drop in pressure in the fluid between the restriction 51 and the receiver is termed herein a down-hill constant.

While I have herein described this invention as particularly adapted for the construction of a tire inflating device and have shown the zone 47 connected with a pressure gauge, it is understood that the device may be employed for controlling the flow of various gases from various gas supplies to various gas receivers and it is not intended to limit the invention either to its use as an inflating device or limit the invention to an embodiment having the zone 47 connected to a pressure gage, as various other devices or members actuated by air or gas pressure may be connected to said zone 47 and improvements in the function of operation of such devices will be obtained.

Thus, in Figure 8 I have illustrated a modified form of invention in which in place of a pressure gage I have substituted another form of gas member 8, to wit a whistling device 54 which may be connected to the zone 47 in place of the air gage previously described and will when so connected automatically commence to whistle when a predetermined pressure is reached in the gas receiver. Said whistling member 54 comprises a whistle opening 55 which communicates with the bore 7 of the body 1. 56 indicates a ball valve pressed against the way 50, leading from the zone 47, by a coiled spring 57. Thus the ball 56 normally closes the way 50, and air or gas can not reach the whistle opening 55. When the pressure in the zone 47 becomes sufficient to overcome the tension of the spring 57, gas or air forces the ball 56 from the passage 50 and causes a whistling noise at the whistle opening 55. In the whistling device 54 I have shown a form whereby the tension of the spring 57 may be regulated to maintain the ball 56 closing the passage 50 until any desired pressure is applied thereto, and thus have provided means whereby the device may automatically whistle when the pressure desired in the gas receiver has been reached. For this purpose, the coil spring 57 seats on a head 58 engaged by a pin 59 extending from the outer end of a tubular sleeve 60. The sleeve 60 is provided on its inner end with threads 61 engaging threads from one of the inner walls of the bore 7 of the body 1. The outer face of the sleeve 60 is provided with indications 62, which are adapted to be successively viewed through an opening 63, provided in the body 1. The indications 62 are made to indicate the pressure in the gas receiver necessary to cause the whistle opening 55 to be set in operation. It is thus seen that the use of an air gage is not essential to the operation of the device.

Another important advantage of this invention is that any lubricant present in the flowing gas is jetted past the zone 47 and does not work up into the gas operated member 8. In this manner the deterioration of the member 8 from lubricant working thereinto is avoided.

While I have herein illustrated the invention as particularly directed to the use of a tire inflating device, it is to be understood that such is but a preferred embodiment of the invention and the invention is not limited to the preferred embodiment nor to the details of construction or parts, as the same may be varied without departing from the spirit of the invention. This invention includes such changes in construction and arrangement of parts as will appear to those skilled in the art and is of the scope set forth in the accompanying claims.

I claim:

1. A device to control the flow of gas from a gas supply to a gas receiver comprising a conduit through which fluid may flow from said gas supply to said receiver, an element in said conduit having an aperture which is restricted as compared with the bore of the conduit so as to produce a jet therein, and a fluid-operated member in communication with the zone of low pressure established by said jet.

2. A device to control the flow of gas from a gas supply to a gas receiver comprising a conduit through which fluid may flow from said gas supply to said receiver, an element in said conduit having an aperture which is restricted as compared with the bore of the conduit so as to produce a jet therein, said device constructed to form a space in communication with said jet in which a zone of relatively low pressure is produced by said jet, and a pressure gage having a closed connection with said space, the restriction of said aperture being so proportioned to the bore of the conduit between the aperture and the receiver, and to the tire valve opening that the zone of relatively low pressure is substantially equal to the pressure in the tire independent of variations of pressure in the source of pressure.

3. A device to control the flow of gas from a gas supply to a tire comprising a conduit, an element in said conduit having an aperture therethrough which is restricted relatively to the bore of said conduit and adapted to produce a jet, said device constructed with a space adjacent the jet in which a reduced pressure zone is established, the bore of said conduit being of larger diameter than said aperture for a distance immediately beyond the aperture, and thence being of still larger diameter, and a pressure gage in communication with said space, the parts being so proportioned relatively to each other and to the valve aperture of a tire to be inflated that the pressure in the reduced pressure zone, will be substantially the same as the tire pressure independent of the pressure of the gas supply.

4. A device to control the flow of gas from a gas supply to a gas receiver comprising a conduit, a device in said conduit having an aperture restricted relatively to the size of the interior of said conduit beyond said restriction to produce a jet therein, whereby a zone of relatively low pressure is produced by said jet, a disk spaced from said jet-producing device and having apertures therein arranged outside the first-named aperture for increasing the jetting effect thereof by causing the gas to flow in converging paths towards the jet produced by said first-named aperture, and a pressure gage having a closed connection with the low-pressure zone space adjacent said jets.

Signed at Los Angeles, California, this 11th day of October, 1923.

JAMES FRANCIS KEY.